(12) United States Patent
Miyawaki et al.

(10) Patent No.: US 11,679,702 B2
(45) Date of Patent: Jun. 20, 2023

(54) VEHICLE SEAT

(71) Applicant: TS TECH CO., LTD., Asaka (JP)

(72) Inventors: Kazuya Miyawaki, Tochigi-ken (JP); Naoto Yamauchi, Tochigi-ken (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/623,960

(22) PCT Filed: Jun. 15, 2020

(86) PCT No.: PCT/JP2020/023373
§ 371 (c)(1),
(2) Date: Dec. 30, 2021

(87) PCT Pub. No.: WO2021/002177
PCT Pub. Date: Jan. 7, 2021

(65) Prior Publication Data
US 2022/0363173 A1    Nov. 17, 2022

(30) Foreign Application Priority Data

Jul. 2, 2019    (JP) .............................. JP2019-123708

(51) Int. Cl.
*A47C 3/025* (2006.01)
*B60N 2/02* (2006.01)
(Continued)

(52) U.S. Cl.
CPC ........... *B60N 2/5642* (2013.01); *B60N 2/501* (2013.01)

(58) Field of Classification Search
CPC .... B60N 2/0232; B60N 2/002; B60N 2/2863; B60N 2/502; B60N 2/501; B60N 2002/0268; B60N 2/10; B60N 2/06
See application file for complete search history.

(56) References Cited

U.S. PATENT DOCUMENTS 5,765,803 A * 6/1998 Graham ................. B60N 2/544
                                                    267/221
9,090,188 B2 * 7/2015 Imamura ................. B60N 2/986
(Continued)

FOREIGN PATENT DOCUMENTS

JP         61-139528 A      6/1986
JP       2014-151769 A      8/2014
(Continued)

OTHER PUBLICATIONS

International Search Report and Written Opinion with English Translation issued in PCT/JP2020/023373, dated July 28, 2020 (11 pages).

*Primary Examiner* — Shin H Kim
(74) *Attorney, Agent, or Firm* — Dority & Manning, P.A.

(57) ABSTRACT

Provided is a vehicle seat with a structure enabling a rockable moving piece to be disposed in a seat face in a well-fitting manner. A vehicle seat in which a rocking means having a drive mechanism and a moving piece for conveying rocking movement of the drive mechanism to a seated person is disposed in a through hole obtained by hollowing out a portion of a seat face of a seat cushion, wherein: a recess which is recessed in the thickness direction so as to surround the through hole is disposed in the seat face of the seat cushion; and the moving piece is shaped so that the bottom surface side follows the recess.

10 Claims, 14 Drawing Sheets

(51) Int. Cl.
*B60N 2/56* (2006.01)
*B60N 2/50* (2006.01)

(56) References Cited

U.S. PATENT DOCUMENTS

| | | | |
|---|---|---|---|
| 9,156,388 B2* | 10/2015 | Nakanishi | B60N 2/688 |
| 10,391,902 B2* | 8/2019 | Gonzalez Uribe | B60N 2/68 |
| 10,940,872 B2* | 3/2021 | Alexiou | B60N 2/5891 |
| 2002/0145321 A1* | 10/2002 | Brightbill | A61G 5/1043 |
| | | | 297/312 |
| 2014/0028074 A1* | 1/2014 | Imamura | A47C 7/18 |
| | | | 297/452.18 |
| 2015/0375638 A1* | 12/2015 | Farooq | B60N 2/06 |
| | | | 296/65.18 |
| 2017/0349061 A1* | 12/2017 | Benson | B60N 2/1615 |
| 2019/0300020 A1* | 10/2019 | Alexiou | G06F 3/016 |

FOREIGN PATENT DOCUMENTS

| | | |
|---|---|---|
| JP | 2017-061221 A | 3/2017 |
| JP | 2018-086996 A | 6/2018 |

\* cited by examiner

VEHICLE SEAT

CROSS REFERENCE TO RELATED APPLICATIONS

This application is the U.S. National Stage entry of International Application No. PCT/JP2020/023373 filed under the Patent Cooperation Treaty and having a filing date of Jun. 15, 2020, which claims priority to Japanese Patent Application No. 2019-123708 having a filing date of Jul. 2, 2019, all of which are incorporated herein by reference.

TECHNICAL FIELD

The present invention relates to a vehicle seat that is installed in a conveyance such as a vehicle.

BACKGROUND ART

JP 2018-086996 A discloses a vehicle seat installed in a conveyance. This vehicle seat eliminates the lack of exercise of a seated person by rocking the seat portion on which the seated person sits.

SUMMARY OF THE INVENTION

However, the above-described vehicle seat has a structure in which a rockable portion (movable portion) of a seat portion largely protrudes from a seat surface of the vehicle seat. For this reason, there is a concern that the vehicle seat may give an uncomfortable feeling to a seated user. In addition, when the size of the movable portion is increased in order to more effectively transmit the rocking motion to the seated person, the exterior appearance of the movable portion is increased, which causes a problem that the movable portion becomes conspicuous.

An object of the present invention is to provide a vehicle seat having a rockable seat portion, in which a rockable movable portion is disposed so as to be well accommodated in a seat surface.

According to an aspect of the present invention, there is provided a vehicle seat including: a seat back configured to support a back of a seated person; a seat cushion configured to support buttocks of the seated person; a frame configured to support the seat cushion and the seat back; a through hole formed by hollowing out part of a seat surface of the seat cushion or the seat back, the through hole communicating with the frame; and a rocking unit including a drive mechanism fixed to a portion of the frame that corresponds to the through hole and a movable portion supported by the drive mechanism, the movable portion being configured to abut against the seated person and transmit rocking motion of the drive mechanism to the seated person, wherein the seat surface is provided with a recessed portion recessed in a thickness direction, the recessed portion being disposed around the through hole, and the movable portion extends to a periphery of the through hole, and a back side (a lower surface) of the movable portion is formed in a shape along the recessed portion.

According to the vehicle seat of the above aspect, the movable portion can be disposed so as to be accommodated well in the seat surface.

DESCRIPTION OF THE INVENTION

Hereinafter, preferred embodiments of the present invention will be described in detail with reference to the accompanying drawings. Note that, in the following description, the direction of "up and down", the direction of "left and right", and the direction of "front and rear" refer respectively to the "up and down" direction, the "left and right" direction, and the "front and rear" direction as viewed from a seated person H (see FIG. 11) seated on the vehicle seat 10.

First Embodiment

Figure 1:
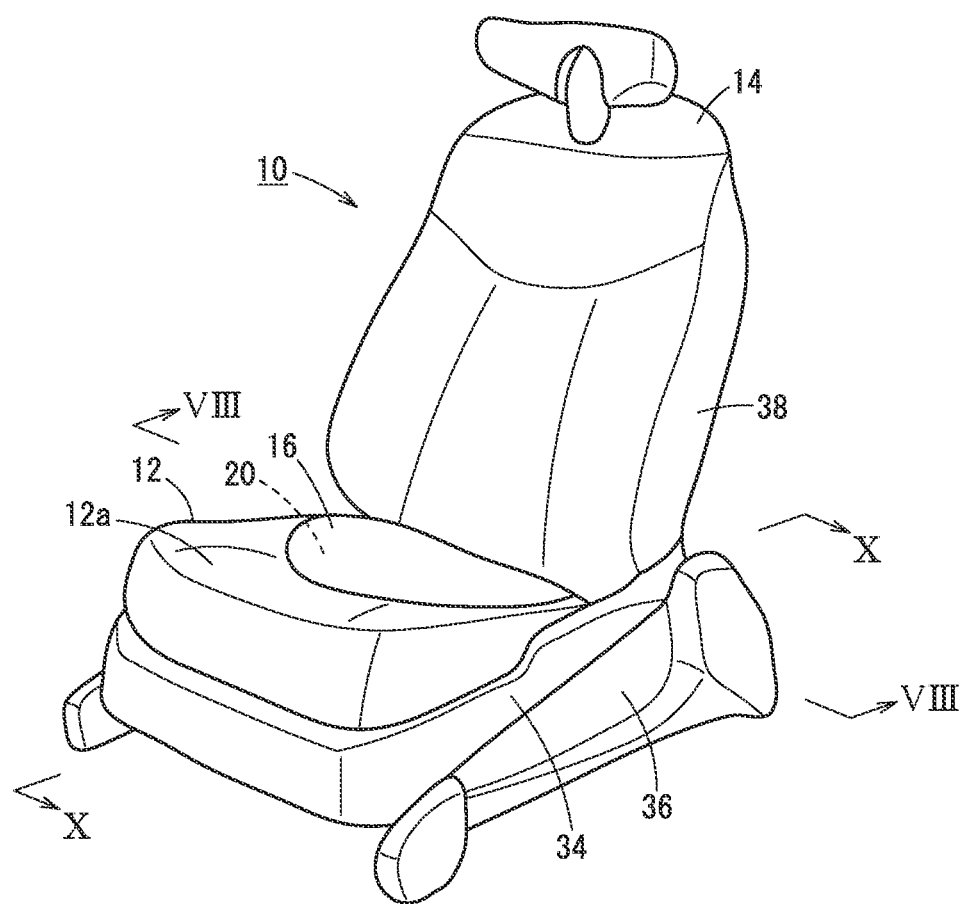
FIG. 1 is a perspective view of a vehicle seat according to a first embodiment of the present invention.

As shown in FIG. 1, a vehicle seat 10 according to the present embodiment includes a seat cushion 12, a seat back 14, and a rocking unit 16. The seat cushion 12 is a seat portion that supports the buttocks of a seated person H (see FIG. 11). The seat back 14 is a backrest. The rocking unit 16 is a member disposed in the seat cushion 12.

The seat cushion 12 includes a seat frame 30 (see FIG. 7), a cushion pad 25a (see FIG. 10), and a skin 25b. The cushion pad 25a is supported by the seat frame 30. The skin 25b covers the cushion pad 25a. The seat back 14 is attached to a rear end portion of the seat cushion 12. Similarly to the seat cushion 12, the seat back 14 includes a seat frame 73, a cushion pad 71, and a skin 72. The cushion pad 71 is supported by the seat frame 73. The skin 72 covers the cushion pad 71. The skin 25b and the skin 72 are made of, for example, a material such as suede fabric or synthetic leather having a good texture.

Figure 2:
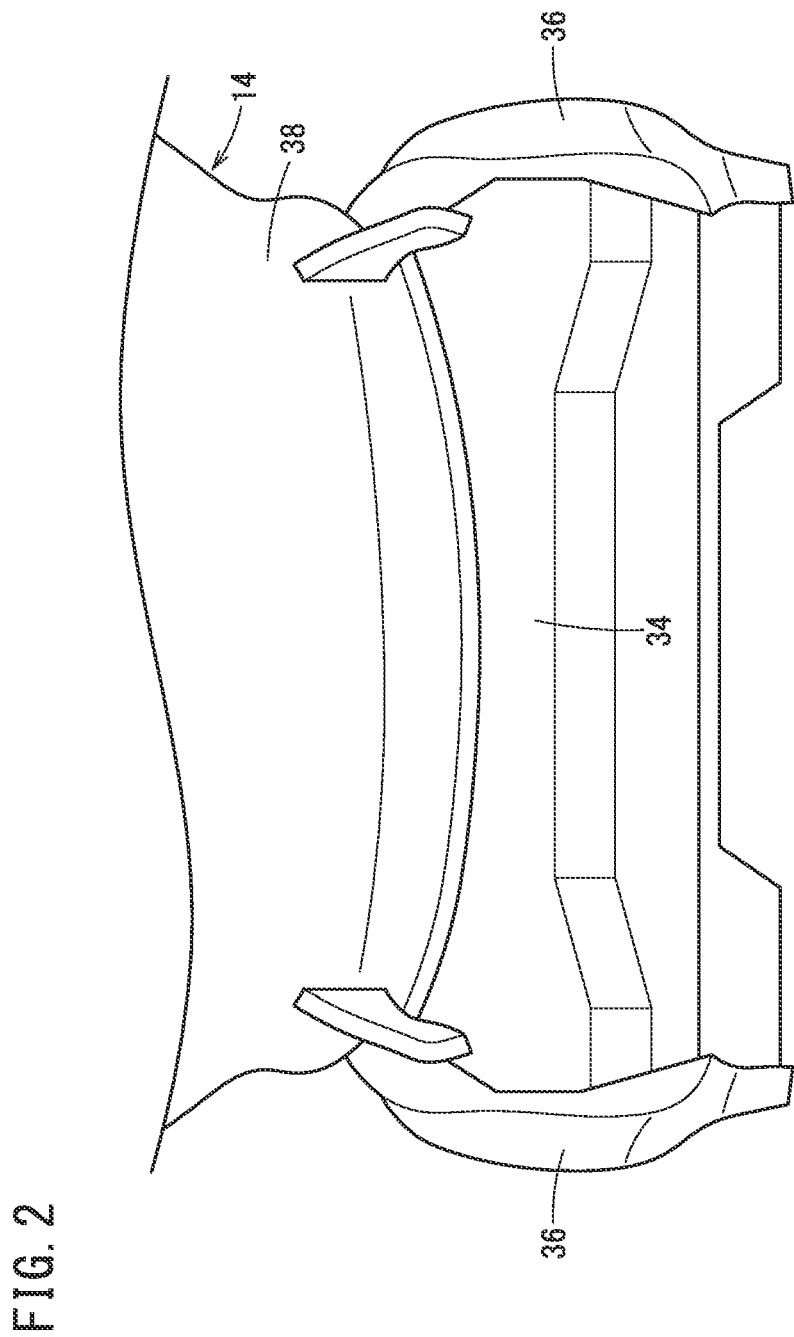
FIG. 2 is a rear view of the vicinity of a lower end portion of the vehicle seat of FIG. 1.

The seat frame 30 of the vehicle seat 10 is disposed on a slide mechanism 60. The slide mechanism 60 is capable of adjusting the position of the vehicle seat 10 in the front-rear direction. The slide mechanisms 60 are disposed on both left and right side portions of the vehicle seat 10. As shown in FIG. 1, the vehicle seat 10 includes a first cover member 34, a second cover member 36, and a third cover member 38 in order to prevent foreign matter from entering the seat frame 30, the seat frame 73, and the slide mechanisms 60. The first cover member 34 mainly covers the seat frame 30. The second cover member 36 covers the slide mechanisms 60. A pair of the second cover members 36 are disposed on both side portions of the vehicle seat 10. The third cover member 38 covers the seat frame 73 at the back portion of the seat back 14. As shown in FIG. 2, the first cover member 34, the second cover member 36, and the third cover member 38 also cover the back portion of the vehicle seat 10.

Figure 5:
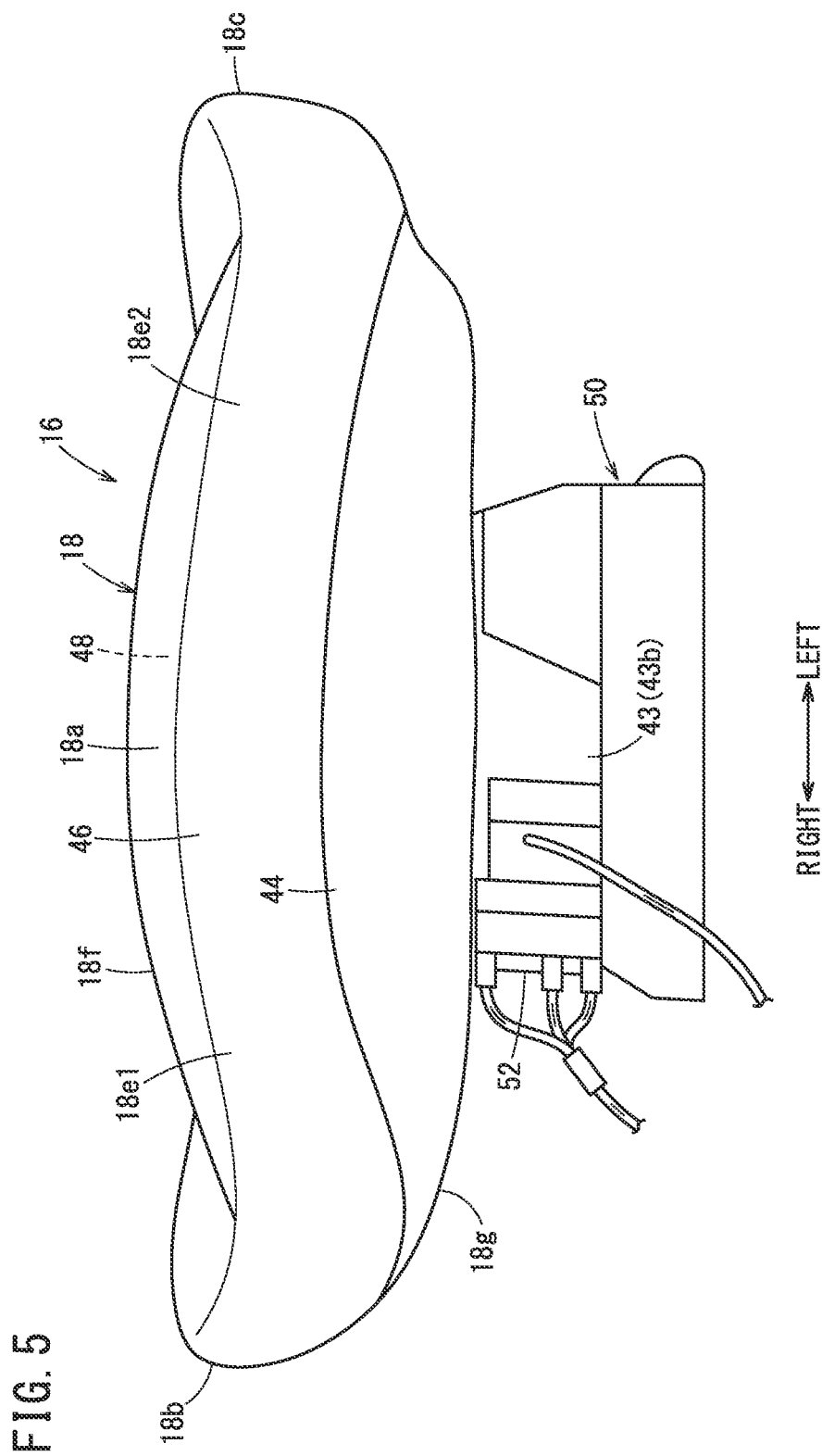
FIG. 5 is a front view of the rocking unit of FIG. 3.
Figure 11:
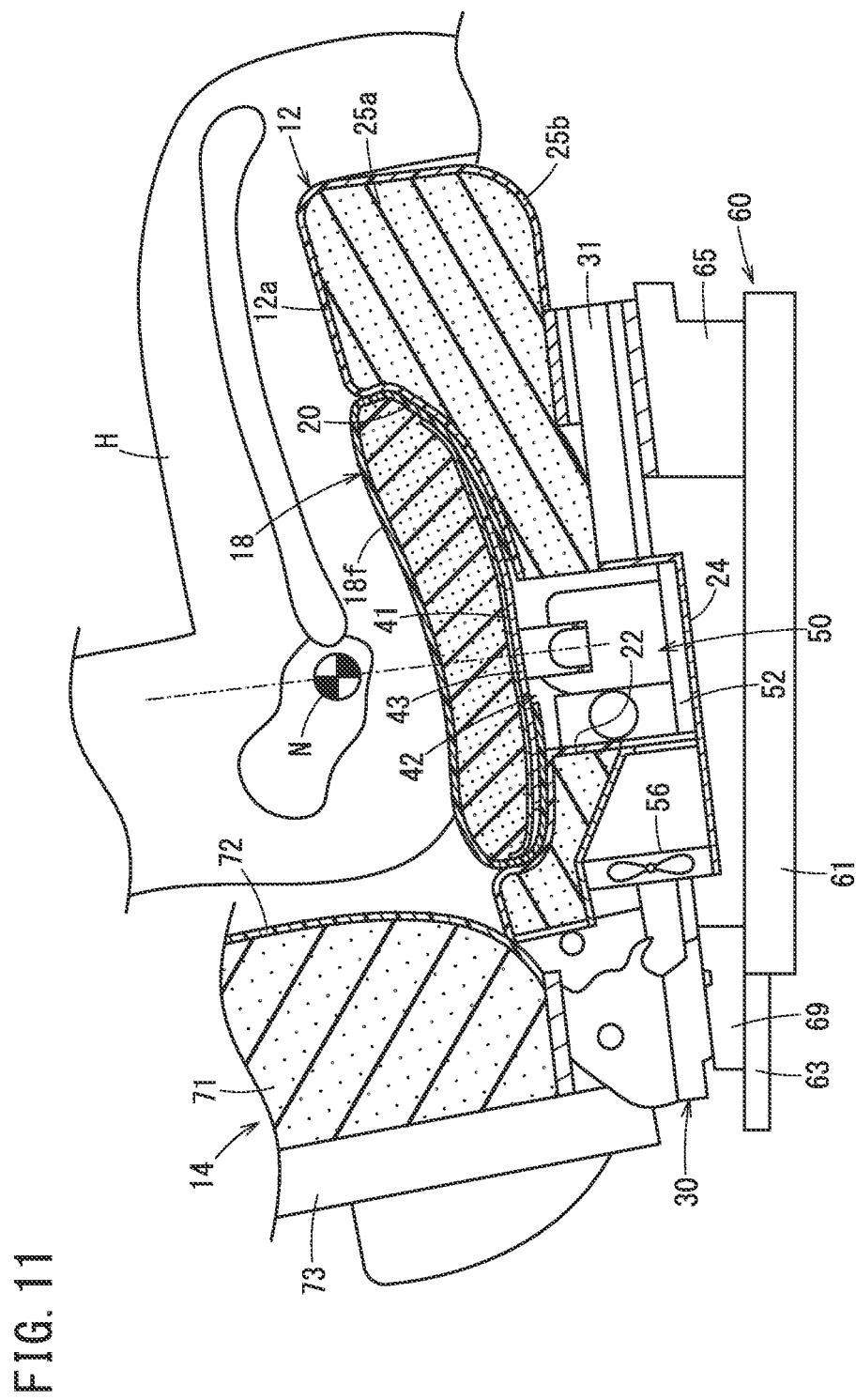
FIG. 11 is a schematic cross-sectional view illustrating a state in which a seated person is seated on the vehicle seat of FIG. 1.

As shown in FIG. 11, the rocking unit 16 is a device that rocks the pelvis portion of the seated person H while supporting the buttocks of the seated person H. A part of the lower side of the rocking unit 16 is disposed inside the seat cushion 12. As shown in FIG. 5, the rocking unit 16 includes a movable portion 18 and a drive mechanism 50. The movable portion 18 abuts against the seated person H. The drive mechanism 50 is disposed below the movable portion 18. Details of the rocking unit 16 will be described later. The rocking unit 16 may be provided on the seat back 14. Although not particularly limited, in the present embodiment, as shown in FIG. 1, an example in which the rocking unit 16 is provided in the seat cushion 12 will be described.

The vehicle seat 10 shown in FIG. 1 is installed, for example, in the driver's seat of a vehicle. The rocking unit 16 rocks the seated person H to thereby exercise the seated person H and eliminate the lack of exercise. Further, the rocking unit 16 reduces fatigue by giving a massage effect to the seated person H. Further, the rocking unit 16 causes the seated person H, i.e., the driver, to pay attention to driving, when the seated person H is distracted.

Figure 3:
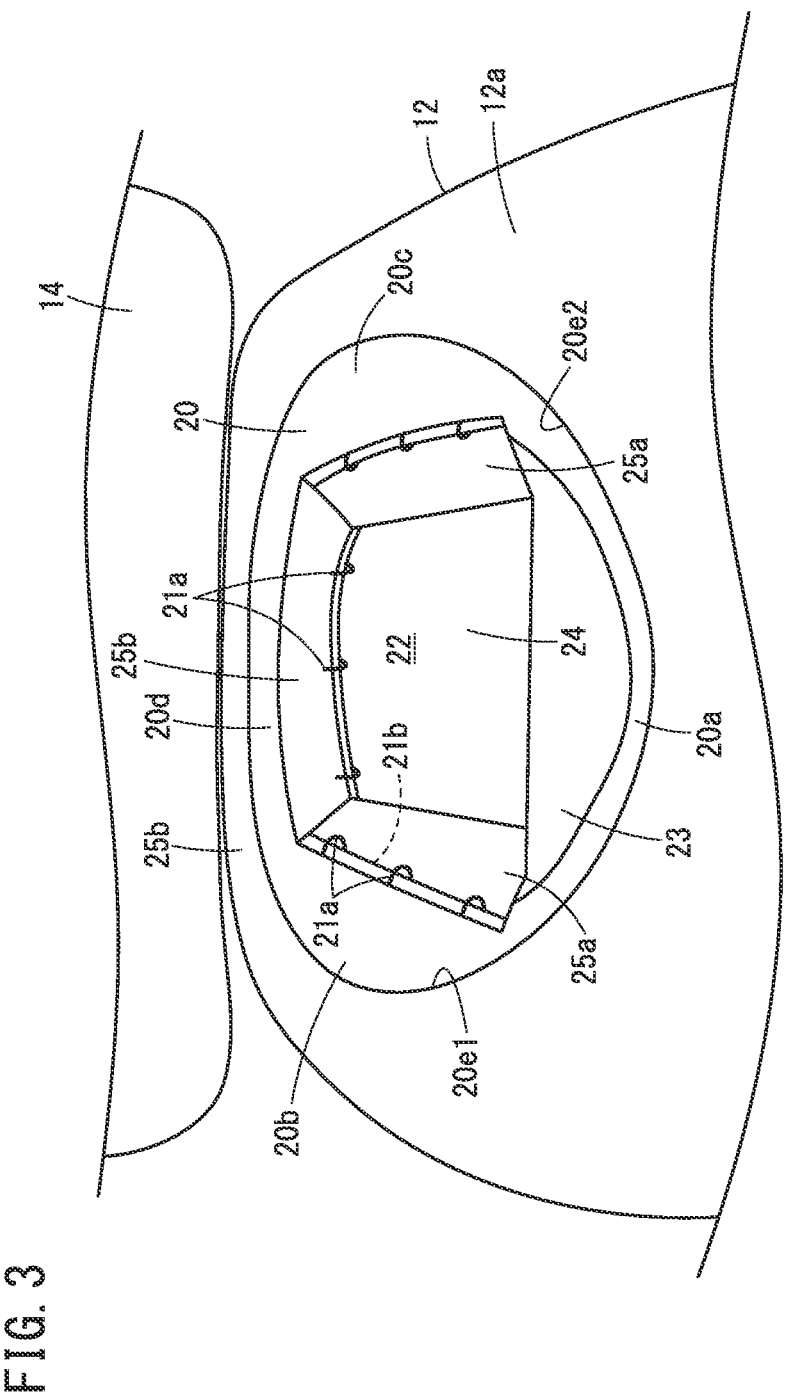
FIG. 3 is a perspective view of a seat cushion from which a rocking unit of FIG. 1 is removed.
Figure 4:
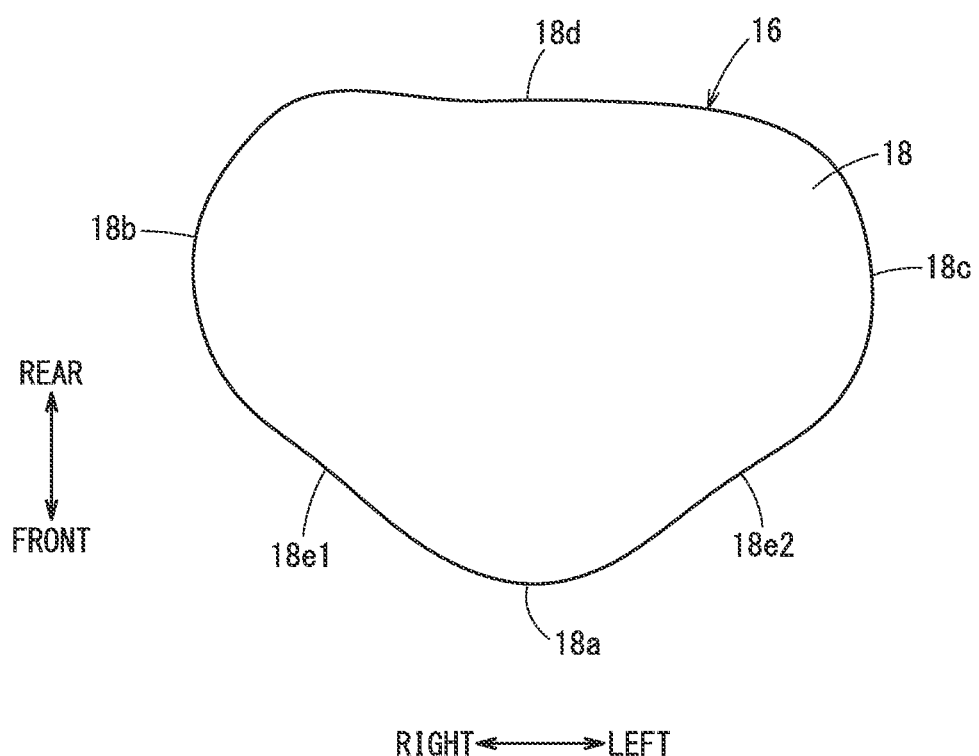
FIG. 4 is a plan view of the rocking unit of FIG. 1.

Hereinafter, details of the seat cushion 12 and the rocking unit 16 of the vehicle seat 10 will be described in detail. As shown in FIGS. 3 and 4, the seat cushion 12 has a recessed portion 20 for mounting the rocking unit 16 and a through hole 22 for installing the drive mechanism 50 of the rocking unit 16. The recessed portion 20 has a shape corresponding to the planar shape of the movable portion 18 so as to accommodate the movable portion 18 with a good fit. That is, the recessed portion 20 has a front edge portion 20e1 and a front edge portion 20e2 as edges on the front side. The front edge portion 20e1 and the front edge portion 20e2 extend forward while being inclined with respect to the left-right direction. In the recessed portion 20, the front edge portions 20e1 and 20e2 form a substantially triangular shape that protrudes forward while narrowing in the width direction. The recessed portion 20 further includes a front recess 20a corresponding to a front end 18a of the movable portion 18, a right recess 20b corresponding to a right end 18b of the movable portion 18, a left recess 20c corresponding to a left end 18c of the movable portion 18, and a rear recess 20d corresponding to a rear end 18d of the movable portion 18. The front recess 20a has a larger area than the right recess 20b, the left recess 20c, and the rear recess 20d.

Figure 8:
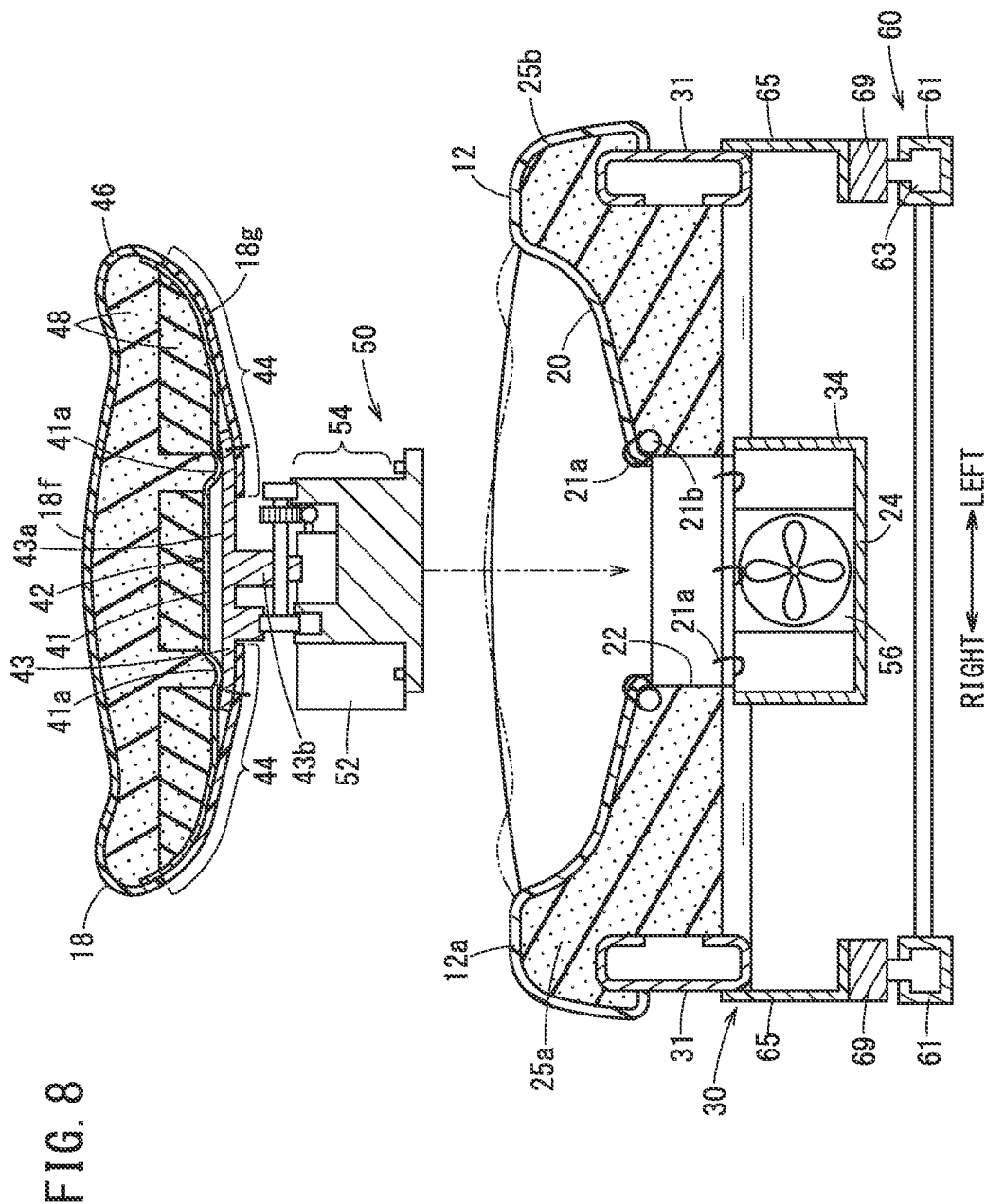
FIG. 8 is an exploded cross-sectional view taken along line VIII-VIII of FIG. 1.

As shown in the cross-sectional view of FIG. 8, the recessed portion 20 has an inclined surface which causes the depth of the recessed portion in the thickness direction to gradually increases toward the central through hole 22. The recessed portion 20 is recessed most deeply in the thickness direction at a boundary with the through hole 22.

As shown in FIG. 3, the through hole 22 is formed substantially at the center of the recessed portion 20. The through hole 22 has a structure in which a cushion pad 25a configuring the seat cushion 12 is hollowed out in the thickness direction. As shown in FIG. 8, the through hole 22 forms a space for installing the drive mechanism 50 of the rocking unit 16. The through hole 22 has a rectangular planar shape having dimensions similar to the planar shape of the rocking unit 16. The shape of the through hole 22 is not particularly limited to a rectangular shape. The shape of the through hole 22 is appropriately set according to the shape of the drive mechanism 50 of the rocking unit 16.

As shown in FIG. 3, the front recess 20a has a larger horizontal dimension, in the recessed portion 20. Accordingly, the front recess 20a has a friction reducing portion 23. The friction reducing portion 23 is made of cloth having a friction coefficient smaller than that of the skin 25b of the seat cushion 12. As the cloth having a smaller friction coefficient, the friction reducing portion 23 can use, for example, cloth made of a fiber having a small friction coefficient such as a nylon fiber, a high molecular weight polyethylene fiber, or a fluororesin fiber. The recessed portion 20 other than the friction reducing portion 23 is covered with the skin 25b. The cushion pad 25a is not exposed from the recessed portion 20.

The skin 25b is fixed to the cushion pad 25a at a boundary between the recessed portion 20 and the through hole 22. The boundary between the recessed portion 20 and the through hole 22 is most recessed in the recessed portion 20. As shown in FIG. 8, the cushion pad 25a has a wire 21b embedded in the vicinity of the boundary between the recessed portion 20 and the through hole 22 of the cushion pad 25a. The wire 21b is disposed so as to surround the periphery of the through hole 22. An end portion of the skin 25b is fixed to the wire 21b via a C-shaped clip 21a. As shown in FIG. 3, when one end of the skin 25b is fixed to the boundary between the recessed portion 20 and the through hole 22, a smooth surface without irregularities is formed on the inclined portion between the edge and the through hole 22 of the recessed portion 20. Further, a force applied to the clip 21a from the outside of the vehicle seat 10 is suppressed by attaching the clip 21a to the boundary between the recessed portion 20 and the through hole 22. This structure reduces the load on the clip 21a.

The cushion pad 25a may be exposed on the side wall of the through hole 22. The skin 25b only has to be fixed at a portion other than the inclined portion of the recessed portion 20. The skin 25b may cover an inner side portion of the through hole 22. In the example of FIG. 3, the skin 25b covers the inner surface of the rear end portion of the through hole 22. In this case, the skin 25b is fixed to the cushion pad 25a by the clip 21a, near the bottom of the through hole 22. The skin 25b may pass through the through hole 22 and be folded back and fixed to the back side of the cushion pad 25a.

Figure 6:
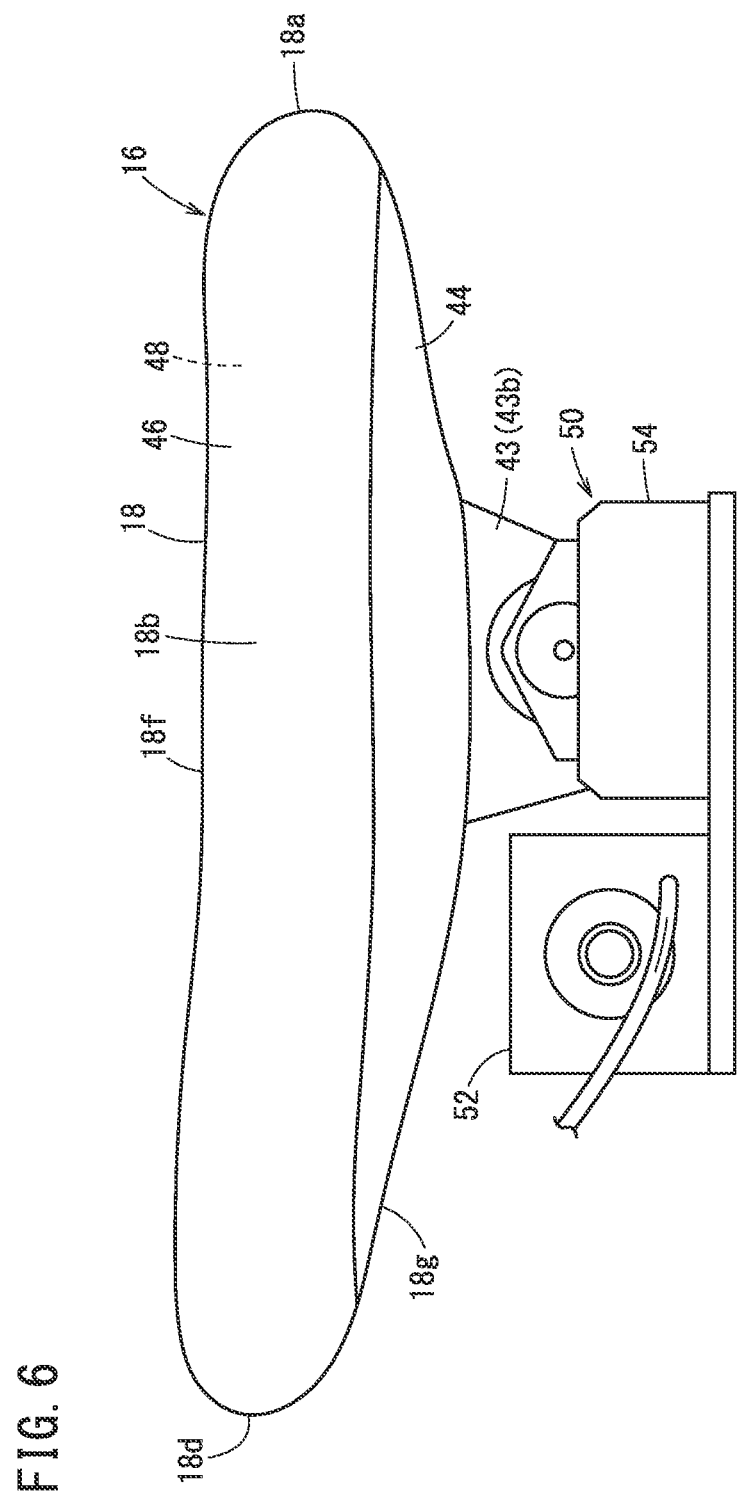
FIG. 6 is a side view of the rocking unit of FIG. 3.

As shown in FIGS. 5 and 6, the rocking unit 16 includes a movable portion 18 disposed at an upper end thereof and a drive mechanism 50 for supporting and driving the movable portion 18. A portion of an upper surface 18f of the movable portion 18 abuts against the seated person H (see FIG. 11). The movable portion 18 transmits the rocking motion generated by the drive mechanism 50 to the seated person H.

As shown in FIG. 4, the movable portion 18 has a substantially triangular shape in plan view. The movable portion 18 has a front edge 18e1 and a front edge 18e2 that are inclined in plan view. The front edge 18e1 and the front edge 18e2 protrude toward the front end 18a while narrowing in the left-right direction. The movable portion 18 has the right end 18b and the left end 18c in addition to the front end 18a. The front end 18a, the right end 18b, and the left end 18c have a rounded shape. The movable portion 18 has the rear end 18d linearly extending in the left-right direction at a rear end portion thereof. Since the movable portion 18 is formed in a substantially triangular shape which is rounded as a whole, even when motion of the front end 18a is stopped in a state of being inclined from the center in the left-right direction, it is possible to reduce a visual sense of discomfort to the seated person H and an uncomfortable feeling of the seated person H seating the seat.

As shown in FIG. 8, the movable portion 18 further includes a support body 42 that receives the rocking displacement of the drive mechanism 50, a cushion pad 48 that covers the upper side of the support body 42, and a skin 46 that covers the outer surface of the cushion pad 48. The cushion pad 48 has flexibility to the extent that cushioning properties equivalent to those of the surrounding seat cushion 12 are exhibited. The skin 46 covering the cushion pad 48 is made of a material equivalent to that of the skin 25b of the seat cushion 12.

The support body 42 comprises a flexible plate 41 in contact with the lower end of the cushion pad 48 and a rigid member 43 disposed under the flexible plate 41. The rigid member 43 includes a plate-shaped upper end portion 43a curved in a concave shape, and a column portion 43b protruding downward from a central portion of the upper end portion 43a. The column portion 43b is brought into contact with a shaft member 54 at an arc-shaped contact surface, thereby causing an inclined displacement and a rotational displacement around the axis of the column portion 43b.

The flexible plate 41 includes a plurality of protrusions 41a protruding toward an upper end portion 43a of the rigid member 43. The protrusion 41a slides along the concave surface of the rigid member 43 while abutting against the upper end portion 43a of the rigid member 43. The flexible plate 41 converts part of displacement due to inclination of the rigid member 43 into displacement in the horizontal direction through sliding of the protrusion 41a. The flexible plate 41 is a plate-shaped member made of a flexibly deformable resin material. When the movable portion 18 is displaced and pressed against the recessed portion 20, the flexible plate 41 is flexibly deformed together with the cushion pad 48. As a result, the ability of the movable portion 18 to follow the recessed portion 20 is improved, and smooth rocking motion of the movable portion 18 becomes possible. Since the movable portion 18 includes the flexible plate 41 and the rigid member 43, it is possible to perform a twisting operation and a swinging operation in which a horizontal displacement and a rotational displacement around an axis are combined.

A lower surface 18g of the movable portion 18 is covered with a friction reducing portion 44 made of cloth having a friction coefficient smaller than that of the skin 46. The friction reducing portion 44 is joined to an end portion of the skin 46 on the lower surface of the movable portion 18 by sewing. The friction reducing portion 44 extends to the vicinity of the column portion 43b of the rigid member 43 of the movable portion 18. The end portion of the friction reducing portion 44 is preferably extended to the inner side of the clip 21a of the skin 25b of the cushion pad 25a. In this way, by stretching the friction reducing portion 44 inward, the movable portion 18 can prevent foreign matter from entering the internal structure. The end portion of the friction reducing portion 44 is fixed to the rigid member 43 by, for example, screwing.

The friction reducing portion 44 is formed of, for example, cloth made of a fiber having a small friction coefficient such as a nylon fiber, a high molecular weight polyethylene fiber, or a fluororesin fiber. The friction reducing portion 44 reduces frictional resistance between the lower surface 18g of the movable portion 18 and the recessed portion 20 of the seat cushion 12, and enables smooth rocking motion of the movable portion 18.

The drive mechanism 50 includes a motor 52 and a shaft member 54 that transmits a rotational operation of the motor 52 to the movable portion 18 as a rocking displacement. The shaft member 54 includes a gear, a screw shaft, an eccentric shaft member, and the like. The shaft member 54 causes a rocking displacement including a predetermined twist operation and swing operation in the movable portion 18.

The rocking unit 16 is mounted on the seat cushion 12 through the through hole 22. The drive mechanism 50 of the rocking unit 16 is inserted into the through hole 22 of the seat cushion 12. The drive mechanism 50 is housed in a housing portion 24 of the seat frame 30. The bottom portion of the drive mechanism 50 is fixed to the bottom portion of the housing portion 24 by fastening bolts. The drive mechanism 50 includes a motor 52. The motor 52 is disposed so as to avoid a position overlapping the lower side of the recessed portion 20. The drive mechanism 50 can be made compact by arranging the large-sized motor 52 at a position not overlapping with the recessed portion 20. Such a drive mechanism 50 enables the seat cushion 12 to be made thinner. Since the motor 52 has a predetermined thickness, when the seated person H sits on the seat, there is a concern that the seated person H may feel uncomfortable due to the hard protruding portion hitting the leg of the seated person. As such, it is preferable that the motor 52 of the drive mechanism 50 be disposed rearward of the shaft member 54 as shown in the drawings.

Figure 7:
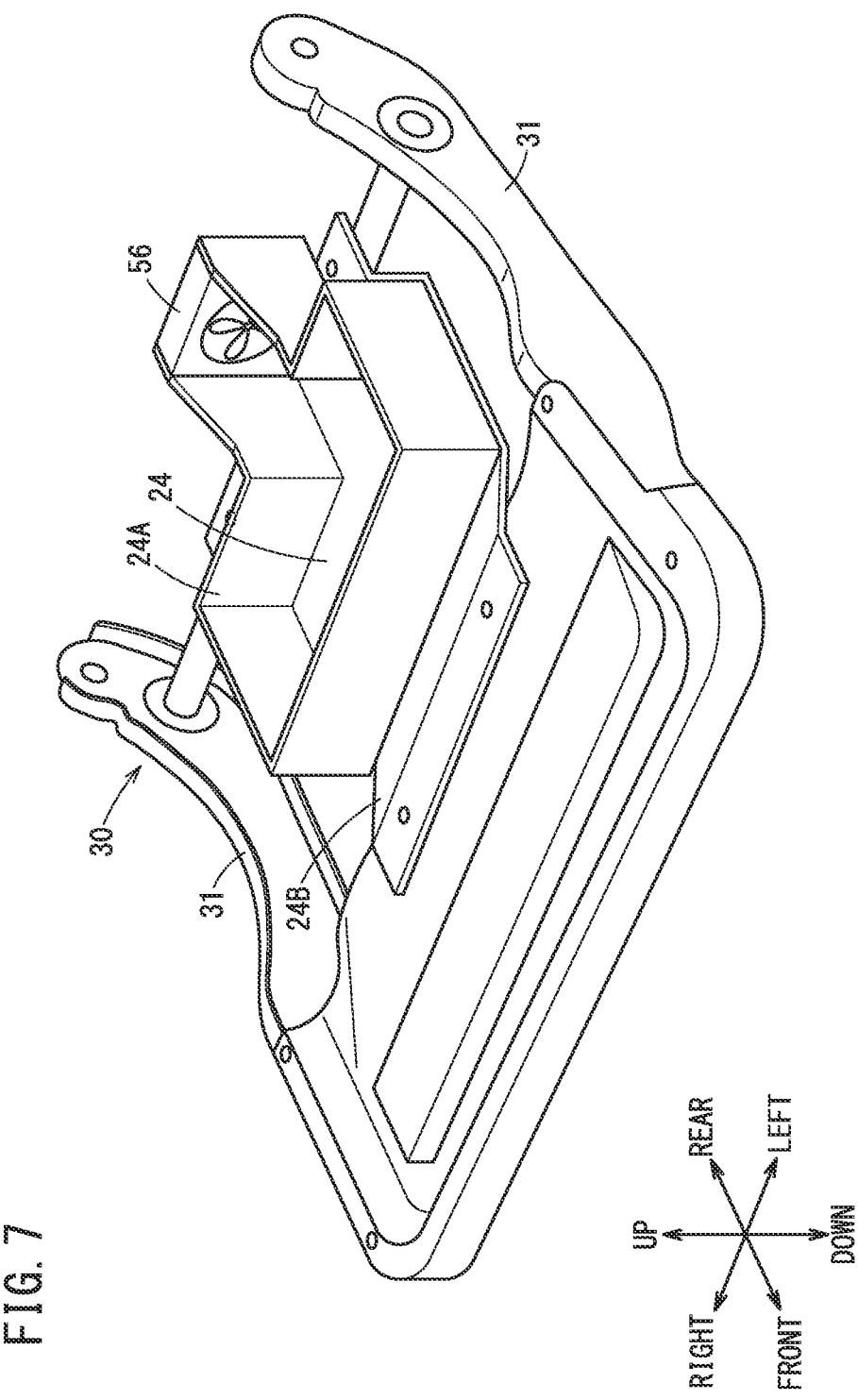
FIG. 7 is a perspective view of a seat frame of the seat cushion of FIG. 1.

As shown in FIG. 7, the seat frame 30 has the housing portion 24. The housing portion 24 is disposed at a portion corresponding to the through hole 22 of the seat cushion 12. The housing portion 24 has a rectangular partition wall 24A surrounding the periphery. The partition wall 24A of the housing portion 24 is joined onto an attachment plate 24B installed on the seat frame 30. The partition wall 24A has a size equal to or larger than that of the through hole 22. The partition wall 24A communicates with the through hole 22. The partition wall 24A prevents dust or the like from entering the drive mechanism 50. The housing portion 24 is held between the pair of side frames 31.

The partition wall 24A has a fan 56 at a rear end portion thereof. The fan 56 dissipates heat generated by the motor 52 inside the partition wall 24A to the outside. The fan 56 prevents heat accumulation of the motor 52. In this way, the fan 56 prevents a reduction in power of the motor 52 due to overheating. The fan 56 is disposed away from the rear end portion of the first cover member 34 shown in FIG. 2. Such an arrangement of the fan 56 facilitates spreading of exhaust air of the fan 56 into the first cover member 34.

Figure 10:
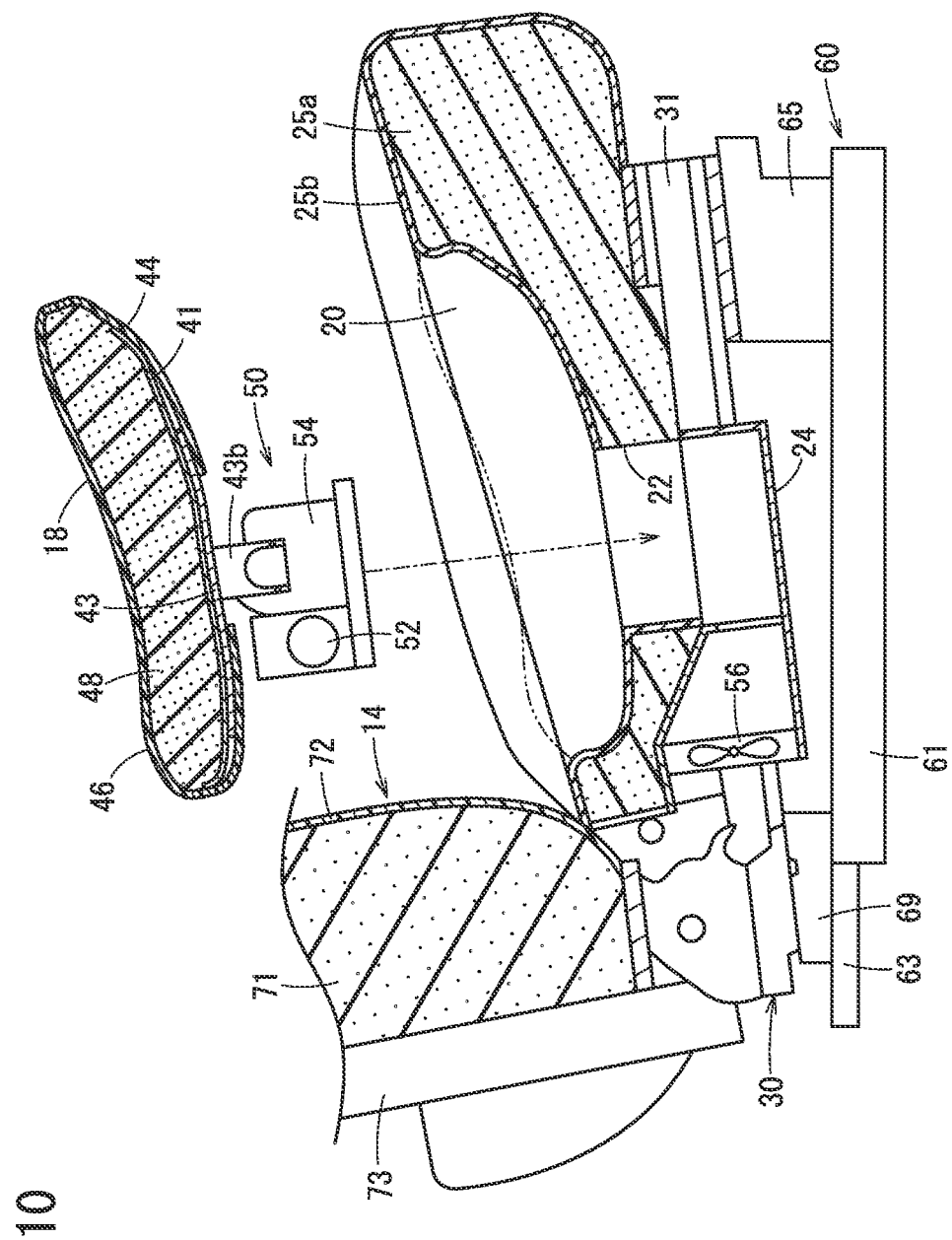
FIG. 10 is an exploded cross-sectional view taken along line X-X of FIG. 1.

As shown in FIG. 10, the fan 56 is preferably disposed at a position outside the recessed portion 20 of the seat cushion 12. This arrangement prevents interference between the fan 56 and the recessed portion 20 and allows for compact storage of the fan 56 inside the seat cushion 12.

Figure 9:
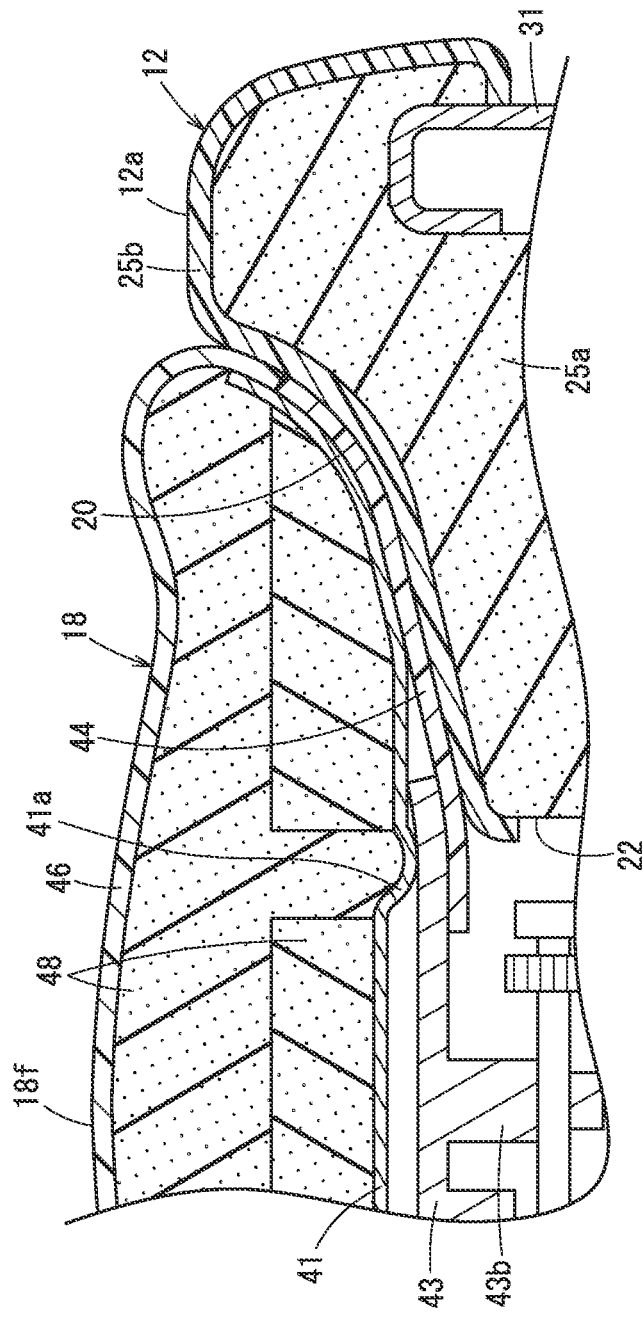
FIG. 9 is an enlarged cross-sectional view of a contact portion between the movable portion and a recessed portion of the seat cushion in FIG. 8.

As shown in FIG. 9, the movable portion 18 is disposed in the recessed portion 20 of the seat cushion 12. Since the recessed portion 20 is formed along the lower surface side of the movable portion 18, most of the movable portion 18 is accommodated in the recessed portion 20. Therefore, the upper surface 18f of the movable portion 18 does not largely protrude from a seat surface 12a of the seat cushion 12, and the upper surface 18f has substantially the same level as the seat surface 12a. In this manner, the movable portion 18 is disposed so as to be accommodated in the seat cushion 12 with a good fit.

As shown in FIG. 10, the vehicle seat 10 includes an angle adjustment member so that the seated person H can sit on the seat cushion 12 in which the movable portion 18 is mounted, without a feeling of strangeness or uncomfortable feeling. The angle adjustment member includes a front spacer 65 and a rear spacer 69 that are disposed between the slide mechanism 60 and the seat frame 30.

The lower end of the front spacer 65 is joined to the vicinity of the front end of a slider 63 that slides on a slide rail 61, and the upper end thereof is joined to the front portion of the seat frame 30. The lower end of the rear spacer 69 is joined to the vicinity of the rear end of the slider 63, and the upper end thereof is joined to the rear portion of the seat frame 30. The front spacer 65 is higher than the rear spacer 69, and is arranged to lift the front side of the seat cushion 12 upward. The front spacer 65 and the rear spacer 69 are fastened to the seat frame 30 and the slider 63 by bolting, and can be easily replaced with other spacers having a desired height.

The vehicle seat 10 of the present embodiment is configured as described above, and operation thereof will be described below.

As shown in FIG. 11, in the vehicle seat 10, the movable portion 18 of the rocking unit 16 is mounted on the seat cushion 12 in a manner of being accommodated in the recessed portion 20 of the seat cushion 12. The shape of the recessed portion 20 is formed to be deeper in the thickness direction along the shape of the bottom portion of the movable portion 18. As a result, the upper surface 18f of the movable portion 18 is well disposed in the seat cushion 12 in a manner that the upper surface 18f is substantially flush with the seat surface 12a of the seat cushion 12. Even though the seat cushion 12 has the large rocking unit 16, the seated person H can sit on the vehicle seat 10 with a comfortable feeling similar to that of sitting on a normal seat cushion 12. The peripheral portion of the movable portion 18 is constituted by the flexible plate 41 and the cushion pad 48. Therefore, the movable portion 18 is flexibly recessed along with the rocking motion of the rocking unit 16, and thus the movable portion 18 can be rocked even in the recessed portion 20.

In the vehicle seat 10, the rocking unit 16 rocks around the column portion 43b where the drive mechanism 50 and the movable portion 18 abut. The position of the column portion 43b is disposed at a position directly below a hip point N which is the center of the rotation center points of the left and right thighs with respect to the torso of the seated person H. Thus, the rocking unit 16 can rock the seated person H efficiently. In addition, since the movable portion 18 is formed to have a large area expanding outward from the through hole 22, it is possible to apply rocking displacement to a wide area of the buttocks and thighs of the seated person H, and thus it is possible to rock the seated person H efficiently.

The vehicle seat 10 of the present embodiment has the following effects.

There is provided a vehicle seat including: a seat back 14 configured to support a back of a seated person H; a seat cushion 12 configured to support buttocks of the seated person H; a seat frame 30, 73 configured to support the seat cushion 12 and the seat back 14; a through hole 22 formed by hollowing out part of a seat surface 12a of the seat cushion 12 or the seat back 14, the through hole communicating with the seat frame 30; and a rocking unit 16 including a drive mechanism 50 fixed to a portion of the seat frame 30 that corresponds to the through hole 22 and a movable portion 18 supported by the drive mechanism 50, the movable portion being configured to abut against the seated person H and transmit rocking motion of the drive mechanism 50 to the seated person H. The seat surface 12a is provided with a recessed portion 20 recessed in a thickness direction, the recessed portion being disposed around the through hole 22. The movable portion 18 extends to a periphery of the through hole 22. A lower surface 18g of the movable portion 18 is formed in a shape along the recessed portion 20.

With the above-described configuration, the upper surface 18f of the movable portion 18 can be accommodated so as to be substantially flush with the seat surface of the seat cushion 12 or the seat back 14. As a result, even when a large movable portion 18 is provided, the seated person H can be seated on the vehicle seat 10 without a sense of discomfort.

In the above vehicle seat 10 described above, the recessed portion 20 may have an inclined surface which causes a depth of the recessed portion in the thickness direction to gradually increase as the depth of the recessed portion is closer to the through hole 22. With such a configuration, the movable portion 18 can be accommodated compactly in the seat cushion 12 or the seat back 14.

In the above vehicle seat 10, the movable portion 18 includes the rigid member 43 provided on the lower surface 18g side and connected to the drive mechanism 50, the flexible member (the cushion pad 48 and the flexible plate 41) provided above the rigid member 43, and the skin 46 (the friction reducing portion 44) covering the outer surfaces of the flexible member and the rigid member 43. At least an end portion of a peripheral edge of the movable portion 18 in the lower surface 18g of the movable portion 18 is formed of the flexible member (the cushion pad 48 and the flexible plate 41). Accordingly, the movable portion 18 is easily bent, and it is possible to improve the followability to the inclined surface of the recessed portion 20 at the time when the movable portion 18 is rocked.

In the above vehicle seat 10, the lower surface 18g side of the movable portion 18 may be covered with the friction reducing portion 44 having a friction coefficient smaller than that of the skin 25b constituting the seat surface 12a. With this configuration, the movable portion 18 can be easily rocked, and the rocking displacement of the drive mechanism 50 can be efficiently transmitted to the seated person H.

In the vehicle seat 10 described above, the seat back 14 and the seat cushion 12 each may include a cushion pad 25a, 71 fixed to the seat frame 30, 73, and a skin 25b, 72 covering the cushion pad 25a, 71, and the skins 25b, 72 may be fixed to end portions of the through holes 22. With this configuration, it is possible to prevent a force from being applied from the outside of the vehicle seat 10 to the fixed portions of the skins 25b and 72.

In the vehicle seat 10 described above, the drive mechanism 50 may include the motor 52 that operates the movable portion 18, and the seat frame 30 may be provided with a heat dissipation member which is located at a position facing the motor 52. With this configuration, it is possible to prevent a decrease in power of the motor 52 due to heating.

In the vehicle seat 10 described above, the heat dissipation member may include a fan 56 that supplies cooling air, and the rotation center of the fan 56 may be disposed rearward of the recessed portion 20. With this configuration, since the fan 56 is disposed so as to avoid the recessed portion 20, interference between the recessed portion 20 and the fan 56 can be prevented, and the structure can be made compact.

The vehicle seat 10 described above may include the first cover member 34 that covers the entire periphery of the side portion of the seat frame 30, and a space may be provided between the heat dissipation member (fan 56) and the first cover member 34. Thus, the heat of the motor 52 can be efficiently dissipated through the fan 56.

In the vehicle seat 10 described above, the drive mechanism 50 may include the motor 52 that operates the movable portion 18, and the motor 52 may be provided at a position that avoids the recessed portion 20. With this configuration, it is possible to prevent the thick motor 52 from protruding to the cushion pad 25a and giving a sense of discomfort to the seated person H.

In the vehicle seat 10 described above, the movable portion 18 and the recessed portion 20 may be formed in a substantially triangular shape with rounded vertices in a plan view, and one of the vertices may be disposed forward. With such a configuration, even when the movable portion 18 stops in an inclined state, it is possible to suppress a sense of discomfort given to the seated person H in terms of visual and sitting comfort.

Second Embodiment

Figure 12:
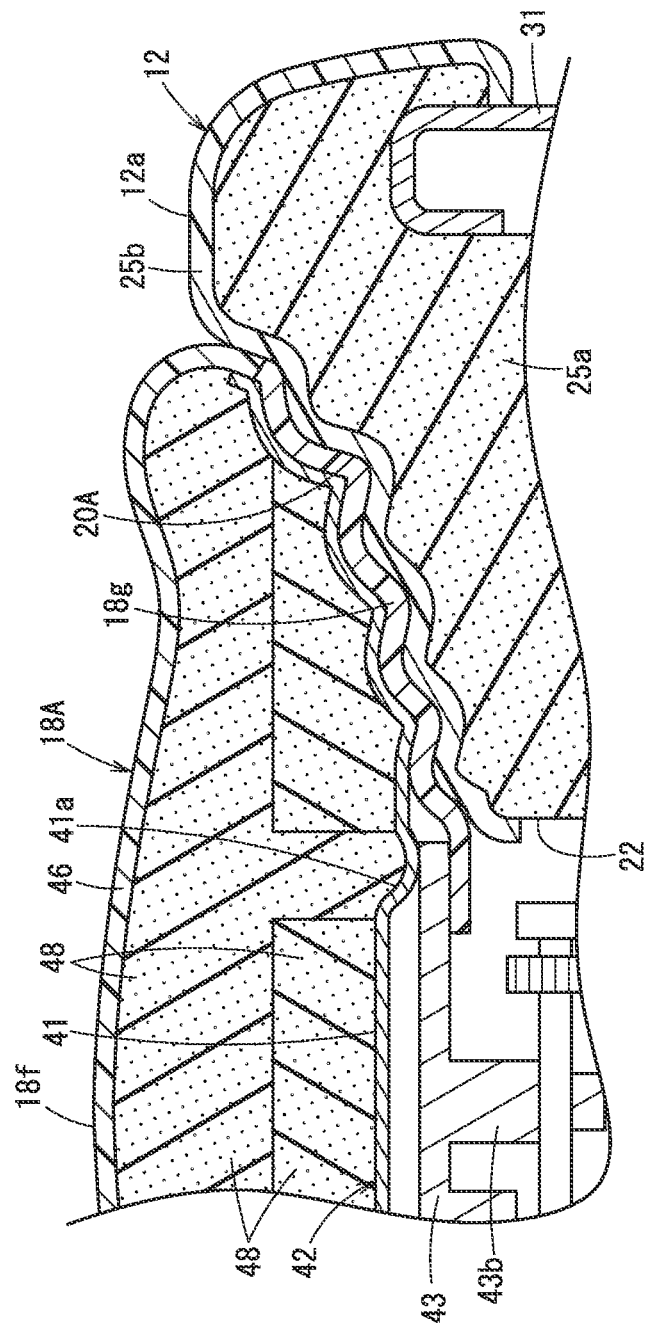
FIG. 12 is a partially enlarged cross-sectional view of a seat cushion and a movable portion according to a second embodiment.

As shown in FIG. 12, in this embodiment, a recessed portion 20A and the lower surface side of a movable portion 18A, of the seat cushion 12, are different in shape from the recessed portion 20 and the movable portion 18 of the first embodiment. The other parts are the same. The same components are denoted by the same reference numerals, and detailed description thereof will be omitted.

The recessed portion 20A is formed to be inclined so as to become deeper in the thickness direction as it approaches the through hole 22. In the present embodiment, the recessed portion 20A is formed in a stepped shape by a plurality of stepped portions, and is configured to become deeper in the thickness direction as approaching the through hole 22 by the stepped portions. The lower surface 18g side of the movable portion 18A is formed in a stepped shape in accordance with the shape of the recessed portion 20A. The movable portion 18A is accommodated in the recessed portion 20A such that the stepped portions of the movable portion 18A and the stepped portions of the recessed portion 20A are aligned with each other.

According to the movable portion 18A and the recessed portion 20A of the present embodiment, the same effects as those of the movable portion 18 and the recessed portion 20 of the first embodiment can be obtained.

Third Embodiment

Figure 13:
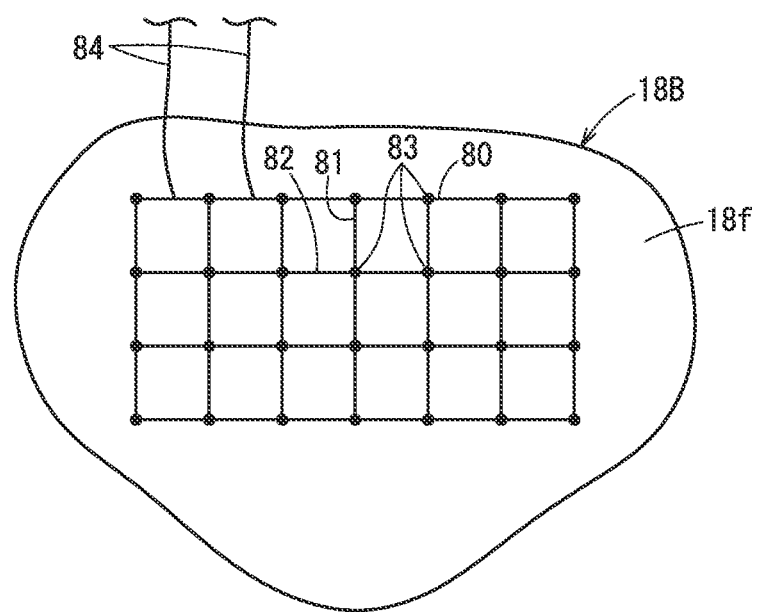
FIG. 13 is a plan view of a movable portion according to a third embodiment.

As shown in FIG. 13, a movable portion 18B of the present embodiment includes, on an upper surface 18f thereof, a sensor 83 that acquires biological information of the seated person H. The sensor 83 may be, for example, a strain sensor that measures the weight of the seated person H. In addition, the sensor 83 may be a strain sensor or a piezoelectric sensor that detects vibration caused by heartbeat or respiration of the seated person H. Further, the sensor 83 may be a temperature sensor that detects the body temperature of the seated person H. Further, the sensor 83 may be an electric field sensor or a magnetic sensor that detects a nerve signal or a myoelectric signal of the seated person H.

When a plurality of sensors 83 are provided, they may be configured as shown in the figure. Vertical wirings 81 and horizontal wirings 82 form a wiring network 80 in a matrix shape, and sensors 83 are disposed at intersections of the vertical wirings 81 and the horizontal wirings 82. A selector (not shown) is connected to the vertical wirings 81 and the horizontal wirings 82, and the selector outputs a detection signal of a predetermined sensor 83. An electric signal from the sensor 83 can be sent to a control circuit (not shown) through a wiring 84.

According to the present embodiment, the biological information of the seated person H can be detected even if the movable portion 18B is provided. The biological information can be used, for example, to give the seated person H an appropriate rocking by the movable portion 18B.

Fourth Embodiment

Figure 14:
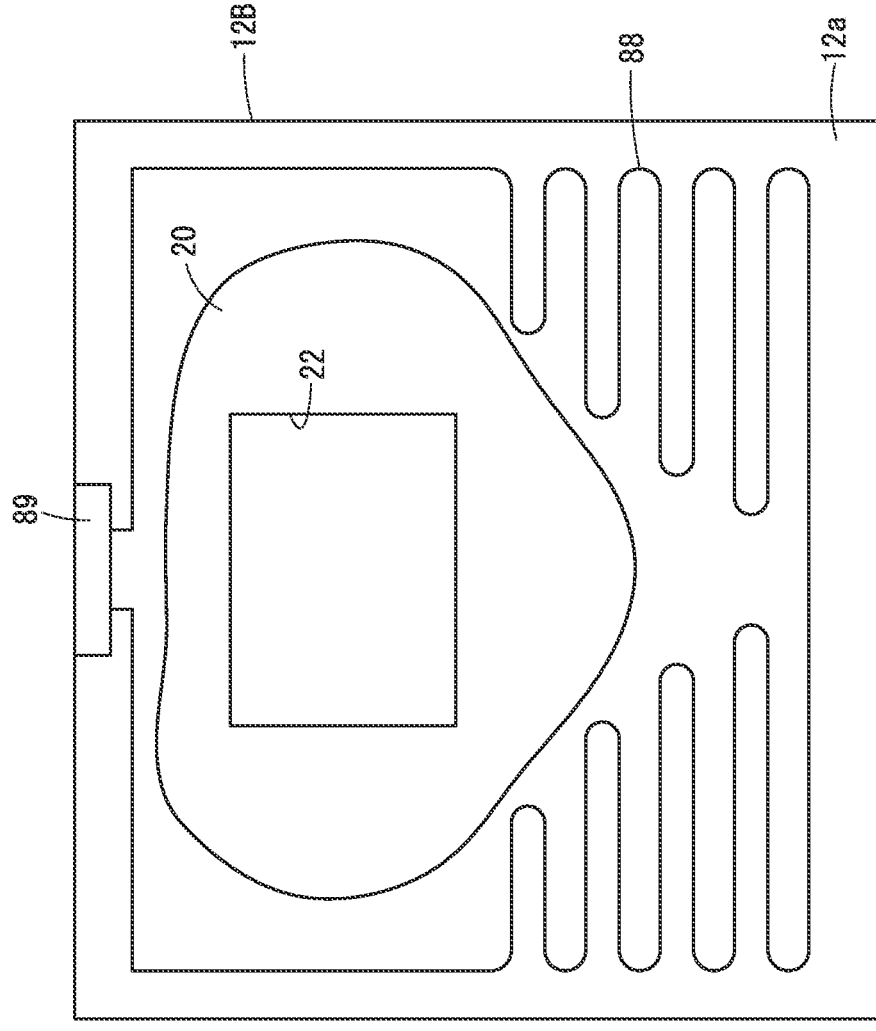
FIG. 14 is a plan view of the inside of the seat cushion according to a fourth embodiment.

As shown in FIG. 14, in the present embodiment, a heater 88 is disposed around the recessed portion 20 of a seat cushion 12B. The heater 88 is formed of a heating wire that generates heat by an electric current flowing through the heating wire, and is routed around the recessed portion 20 as shown in the drawing. The heater 88 is disposed between the cushion pad 25a and the skin 25b. One end and the other end of the heater 88 are connected to connection terminals 89 at a rear end portion of the seat cushion 12. An electric current is supplied to the heater 88 from a vehicle or the like in which the vehicle seat 10 is installed via the connection terminals 89. Thus, the seated person H can be heated simultaneously with the rocking by the movable portion 18. In addition, since the heater 88 is disposed so as to avoid the movable portion 18, disconnection due to rocking can be prevented.

Although preferred embodiments of the present invention has been described above, the present invention is not limited to the embodiments, and it goes without saying that various modifications can be adopted without deviating from the essence and gist of the present invention. When rocking is unnecessary, a triangular cushion pad without the drive mechanism 50 may be mounted in the recessed portion 20, instead of the rocking unit 16. In this case, such a seat can be used as the vehicle seat 10 without a rocking function.

The invention claimed is:

1. A vehicle seat comprising:
   a seat back configured to support a back of a seated person;
   a seat cushion configured to support buttocks of the seated person;
   a frame configured to support the seat cushion and the seat back;
   a through hole formed by hollowing out part of a seat surface of the seat cushion or the seat back, the through hole communicating with the frame; and
   a rocking unit including a drive mechanism fixed to a portion of the frame that corresponds to the through hole and a movable portion supported by the drive mechanism, the movable portion being configured to abut against the seated person and transmit rocking motion of the drive mechanism to the seated person, wherein
   the seat surface is provided with a recessed portion recessed in a thickness direction, the recessed portion being disposed around the through hole, and
   the movable portion extends to a periphery of the through hole, and a lower surface of the movable portion is formed in a shape along the recessed portion.

2. The vehicle seat according to claim 1, wherein the recessed portion has an inclined surface which causes a depth of the recessed portion in the thickness direction to gradually increase as the depth of the recessed portion is closer to the through hole.

3. The vehicle seat according to claim 1, wherein the movable portion includes a rigid member provided on a side of the lower surface and connected to the drive mechanism, a flexible member provided above the rigid member, and a skin covering outer surfaces of the flexible member and the rigid member, and at least an end portion of a peripheral edge of the movable portion in the lower surface of the movable portion is formed of the flexible member.

4. The vehicle seat according to claim 1, wherein the side of the lower surface of the movable portion is covered with a friction reducing portion having a friction coefficient smaller than that of a skin forming the seat surface.

5. The vehicle seat according to claim 1, wherein the seat back and the seat cushion include a cushion pad fixed to the frame and a skin covering the cushion pad, and the skin is fixed to an end portion of the through hole.

6. The vehicle seat according to claim 1, wherein the drive mechanism includes a motor configured to operate the movable portion, and the frame is provided with a heat dissipation member which is located at a position facing the motor.

7. The vehicle seat according to claim 6, wherein the heat dissipation member comprises a fan configured to supply cooling air, and a rotation center of the fan is disposed rearward of the recessed portion.

8. The vehicle seat according to claim 6, further comprising a first cover member that covers an entire periphery of a side portion of the frame, wherein a space is provided between the heat dissipation member and the first cover member.

9. The vehicle seat according to any claim 1, wherein the drive mechanism includes a motor configured to operate the movable portion, and the motor is provided at a position avoiding the recessed portion.

10. The vehicle seat according to claim 1, wherein the movable portion and the recessed portion are formed in a substantially triangular shape having rounded vertices in a plan view, and one of the vertices is disposed forward.

* * * * *